UNITED STATES PATENT OFFICE.

CURTIS C. CADY MORGAN, OF AUBURN, NEW YORK, ASSIGNOR TO HIMSELF, CURTIS C. CADY, AND ELMORE P. ROSS.

IMPROVED SHEET METAL FROM LEAD AND ZINC.

Specification forming part of Letters Patent No. 89,881, dated May 11, 1869.

*To all whom it may concern:*

Be it known that I, CURTIS C. CADY MORGAN, of the city of Auburn, in the county of Cayuga and State of New York, have invented or discovered a new article of manufacture consisting of a composition of lead and zinc, composed of parts of lead and parts of zinc, completely and fully fused and compounded, and also the art or process of fusing said metals by pouring said composition or compound, while in a molten state and being perfectly fused and mixed, into oil, and suffering it to cool therein; and I do hereby declare that the following is a full and exact description thereof, and of the art, mode, and process of fusing and cooling the same.

The nature of my invention or discovery consists in fusing the metals of lead and zinc perfectly in any desired proportions, and cooling the fusion or compound, so that it will be and remain soft, malleable, and ductile, and thus constitute a new article of manufacture, and also in the art or process by which the same is manufactured.

To enable others skilled in the art to make and use my invention, I will proceed to describe its component parts and the proportions thereof which the one bears to the other, and also the art or process of fusing the same and cooling the fusion or compound, so that it will be and remain soft, malleable, and ductile.

I take fifteen parts of lead and melt the same in any proper and convenient vessel, and while the same is in a molten state I take one part of zinc, and having broken or cut the same into small pieces, I put it in the same vessel with the molten lead, intensifying the heat thereof sufficiently to melt the zinc, and I keep the mass agitated or stirred until the zinc shall be fully melted and the whole mass thoroughly mixed and fused together. I then pour the molten mass as thus melted, mixed, and fused, and while in that state, into oil, and leave the same therein until it shall become cool, and the process is complete, and the result will be a compound of lead and zinc constituting a soft, malleable, and ductile article, well fitted for use.

I do not intend to confine myself to any particular proportion of parts, nor to any particular metal or metals, except that one of the metals to be compounded or used shall be zinc, but mix the metals according as the compound shall be desired more or less soft.

Having thus described my invention and discovery and the manner or process of manufacturing the same, what I claim as my invention, and desire to secure by Letters Patent, is—

1. The new article of manufacture composed of lead and zinc, combined in the manner substantially as above described.

2. The process of fusing and combining other metals with zinc by melting and fusing them while in the molten state and cooling the mixture in oil, substantially as above described.

CURTIS C. CADY MORGAN.

Witnesses:
D. WRIGHT,
F. WRIGHT.